April 8, 1930.   R. E. HYDE ET AL   1,753,704
MACHINE FOR CUTTING OFF PIPES AND THE LIKE
Filed Nov. 26, 1927   4 Sheets-Sheet 1

INVENTORS
Ralph E. Hyde and
BY  Daniel Schappi.
Fay, Oberlin & Fay
ATTORNEYS

April 8, 1930.    R. E. HYDE ET AL    1,753,704
MACHINE FOR CUTTING OFF PIPES AND THE LIKE
Filed Nov. 26, 1927    4 Sheets-Sheet 2

INVENTORS
Ralph E. Hyde and
BY Daniel Schappi.
Fay, Oberlin & Fay
ATTORNEYS

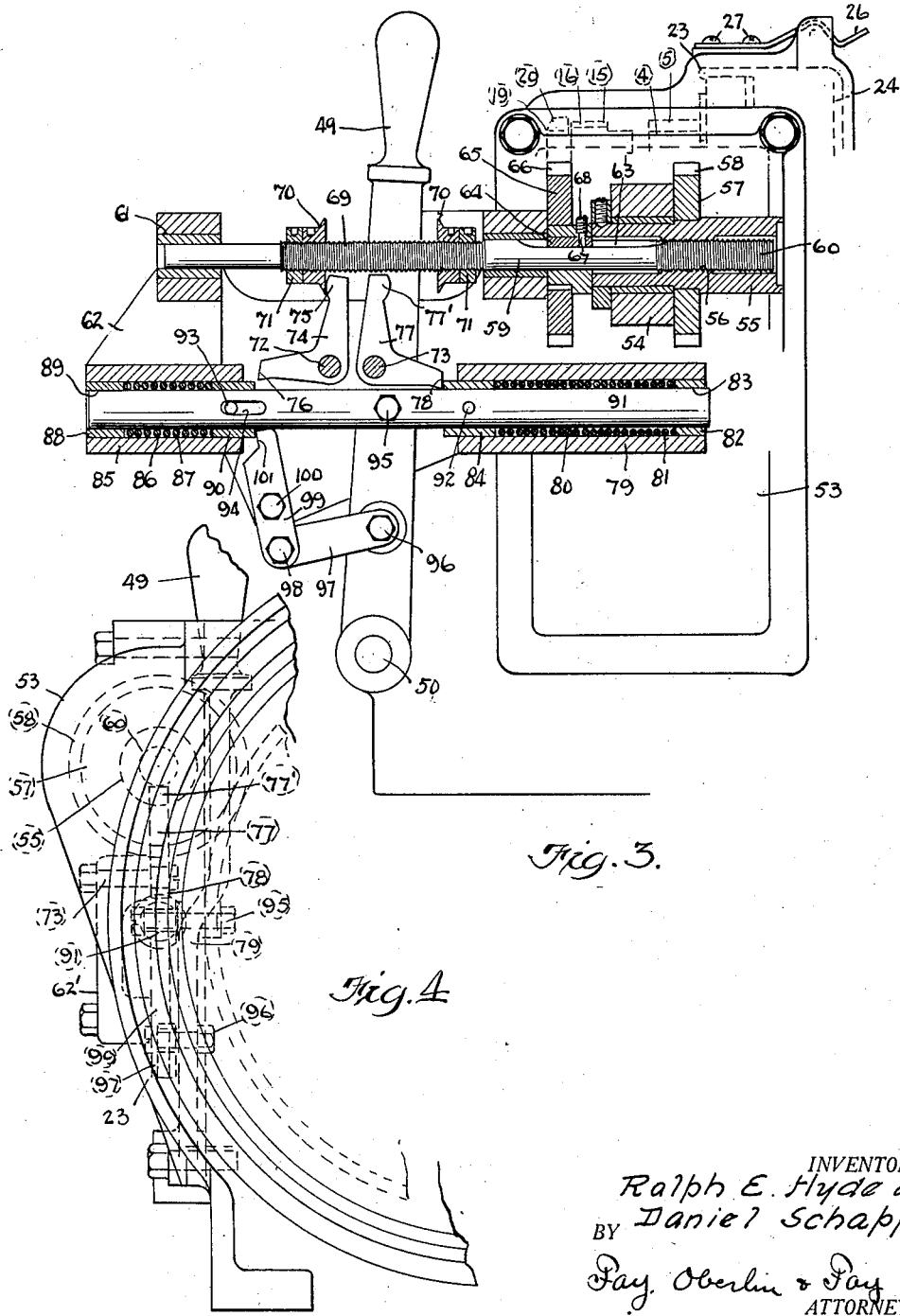

Patented Apr. 8, 1930

1,753,704

UNITED STATES PATENT OFFICE

RALPH E. HYDE, OF CLEVELAND, AND DANIEL SCHAPPI, OF LAKEWOOD, OHIO, ASSIGNORS TO THE OSTER MANUFACTURING COMPANY, OF CLEVELAND, OHIO, A CORPORATION OF OHIO

MACHINE FOR CUTTING OFF PIPES AND THE LIKE

Application filed November 26, 1927. Serial No. 235,881.

The present invention, as indicated, relates to a cut-off machine for pipes, bars, and the like, and the primary object of the invention is to provide a machine of the type indicated which will be adapted for speedy work in making a plurality of cuts on work of a given size. It is, of course, to be understood that the present machine may be adjusted to take work of a wide range of sizes, and that the above statement relates to that type of operation in which a single long length of pipe of a given diameter is to be cut into a number of short pieces. Another object of the invention is to provide a machine in which a plurality of cutters are carried on a rotating plate and are gradually moved radially inward during the cutting operation and then are automatically moved radially outward very quickly after the cut has been made. A further object is to provide a machine of the type indicated in which the cutters are adapted to be moved both inwardly and outwardly without reversing the direction in which the parts are rotating. Still further objects are to provide, in a machine of the type indicated, a novel form of brake, a novel clutch and a novel control means for the brake and clutch, all of which shall function to improve the general operation of the machine. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
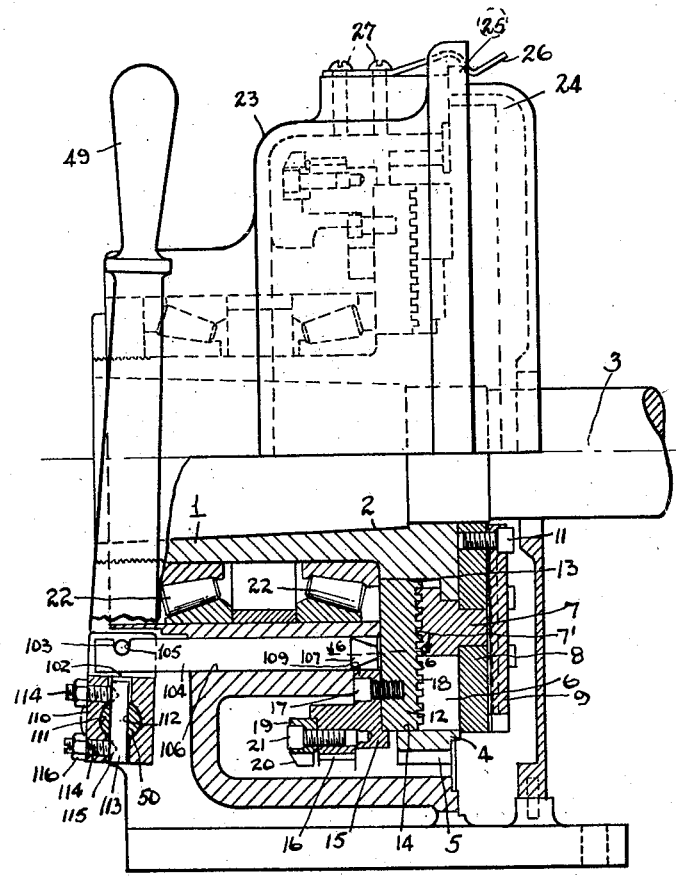
Figure 6:
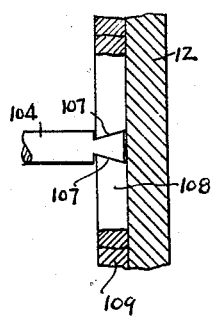
Figure 2:
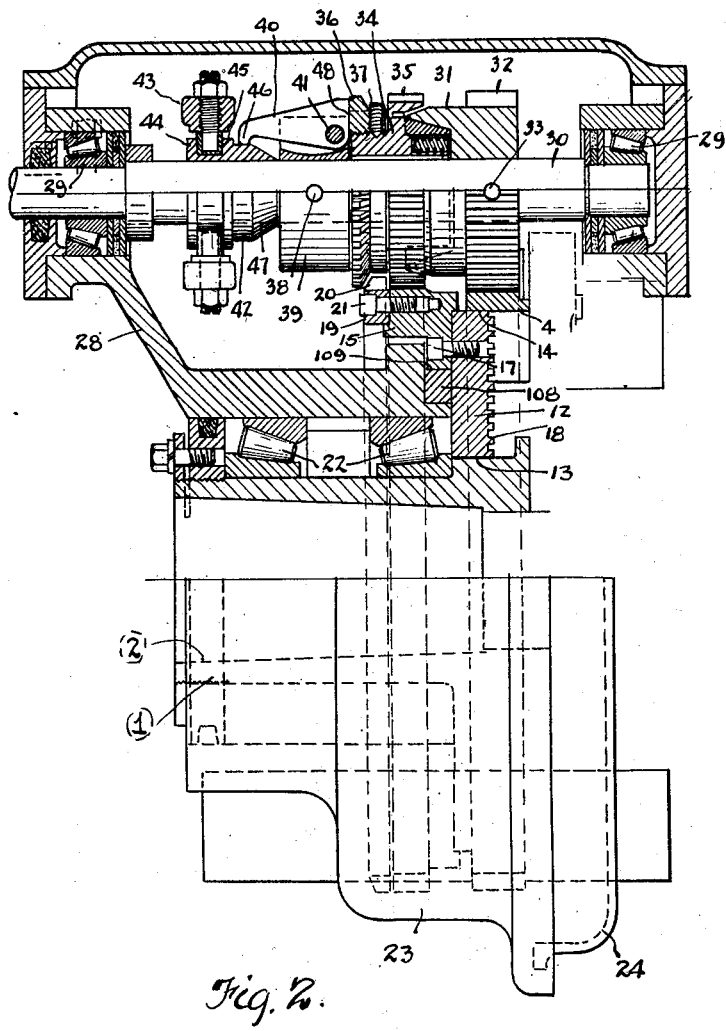
Figure 5:
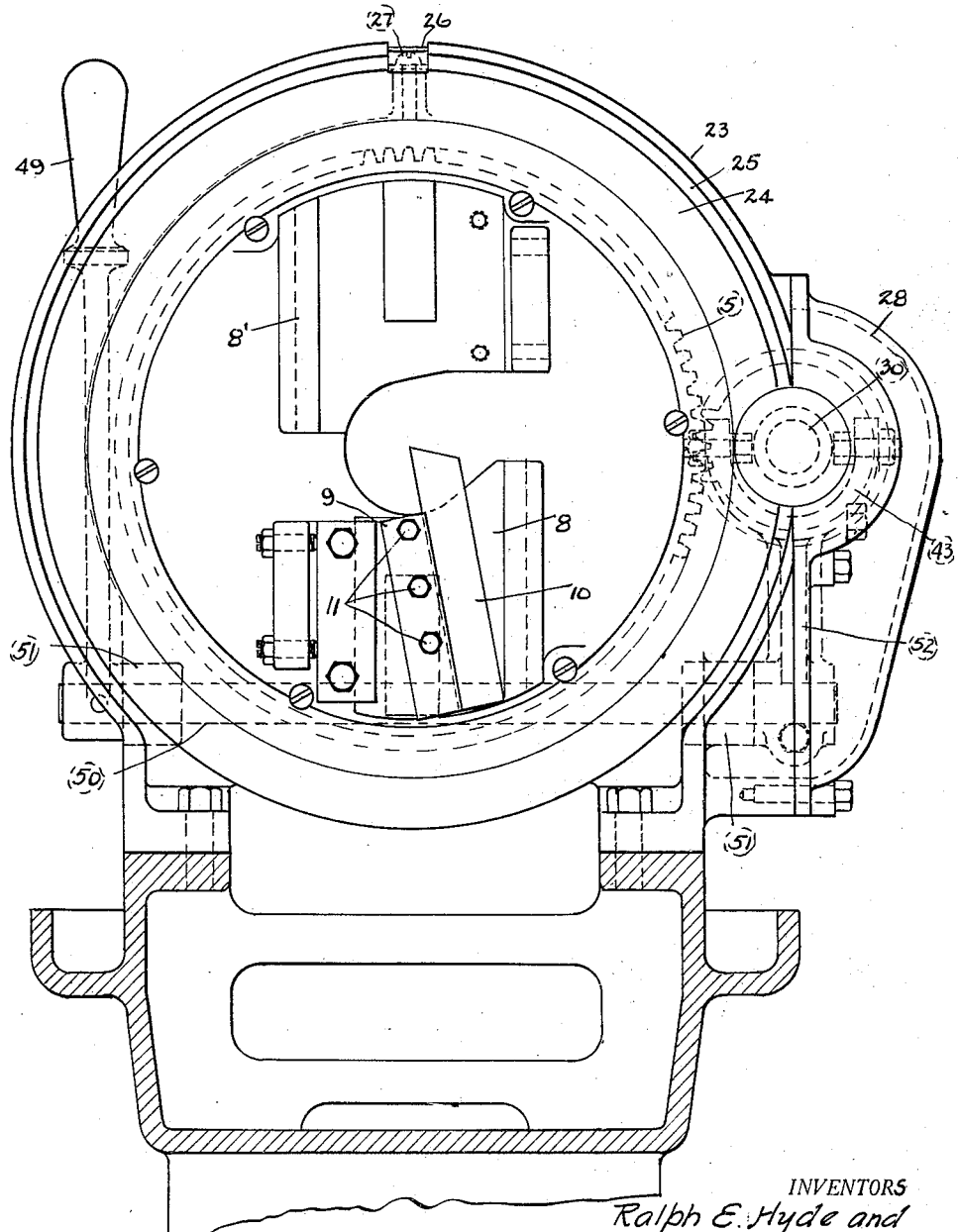

In said annexed drawing:

Fig. 1 is a side elevation partly in section of a machine of the type contemplated by the present invention; Fig. 2 is a sectional view of the driving mechanism; Fig. 3 is a sectional view of the control mechanism; Fig. 4 is a fragmental front elevation of the machine; Fig. 5 is a front elevation showing one of the cutters in place, the other cutter having been removed to show more clearly the cutter slide frame; and Fig. 6 is a detail sectional view taken substantially on the line 6—6 of Fig. 1 and looking in the direction of the arrows.

The reference numeral 1 indicates a tubular spindle mounted for rotation and provided with a bore 2 for the reception of a piece of work indicated at 3. The spindle 1 is provided with an annular flange 4 provided on its periphery with gear teeth 5. The flange 4 is provided with an annular recess 6, and a plurality of radial slots lead from said recess 6 to the outer face of said flange for the reception of slide blocks 7 having teeth 7'. The slide blocks 7 are secured to cutter slide plates 8 which are mounted in frames 8' on the flange 4, and a wedge member 9 is secured to each slide plate 8 to retain the cutters 10 in position thereon. Screws 11 or equivalent fastening means are provided to secure the wedges 9 to the plates 8.

A scroll plate 12 is mounted in the recess 6 and is journalled as at 13 on the spindle 1 and as at 14 in the projecting skirt of the flange 4. An annular ring 15 provided with gear teeth 16 is secured to the rear face of said scroll plate by means of screws 17 or similar fastening means. The scroll plate 12 is provided with a thread or helical cam 18 with which are engaged the teeth 7' of the slide blocks 7. A second smaller annular ring 19 provided with gear teeth 20 is secured to the ring 15 by means of screws 21 or equivalent fastening means. The pitch diameters of the teeth 5 and 20 are equal, while the pitch diameter of the teeth 16 is smaller.

Suitable bearings 22 are provided for the spindle 1, and a casing 23 having an open front end encloses the mechanism heretofore described. A cover plate 24 provided with a lip 25 is adapted to close the open end of the casing 23 and a spring clip 26 is secured to the casing 23 by means of screws 27 and cooperates with the lip 25 to hold the cover plate in place.

The casing 23 is provided with a projection 28 which provides bearings 29 for a drive shaft 30 housed in said projection. A drive pinion 31 provided with teeth 32 is secured to said shaft 30 by means of a pin 33. A feed pinion 34 having teeth 35 is loosely mounted on the shaft 30 adjacent the pinion 31. The pitch diameter of the teeth 35 is greater than the pitch diameter of the teeth 32. As is clearly shown in Fig. 2, the teeth 32 mesh with the teeth 5 of the spindle flange 4, while the teeth 35 mesh with the teeth 16 of the ring 15 secured to the scroll plate 12.

The pinion 34 is provided with a screw-threaded projection on its face removed from the pinion 31 for the reception of an annular friction ring 36, and a set screw 37 is provided for locking the ring 36 to the pinion 34. Closely adjacent said pinion 34 and secured to said shaft 30 by pin 38 is a clutch collar 39 to which are pivoted a plurality of arms 40 by means of pivot pins 41. A cone clutch member 42 is sleeved on said shaft 30, and a clutch yoke 43 is secured to said member 42 between collars 44 and 45 provided thereon. The arms 40 are provided with radially projecting fingers 46 which are adapted to cooperate with the coned surface 47 of the member 42 to force the bearing faces 48 into intimate frictional contact with the friction ring 36.

An operating handle 49 is secured to a rock shaft 50 which is journalled in bearings 51 in the casing 23 and to which is secured the yoke arm 52 which terminates in the clutch yoke 43. A casing 53 is secured to the casing 23 at the side opposite the projection 28 and houses a control mechanism to be described.

A bearing block 54 is rigidly mounted in the casing 53 and provides a mounting for a sleeve 55 which is adapted to rotate therein, but which is held against reciprocation. The sleeve 55 is provided with a bore, a portion of the length of which is threaded as at 56. The sleeve 55 further carries a gear 57 having teeth 58. A control shaft 59 is threaded at one end as at 60 and is received in the threaded bore 56 of the sleeve 55. The opposite end of the shaft 59 is received in a bearing 61 carried on a projecting plate 62 as is clearly shown in Fig. 3 of the drawing. Adjacent the threaded portion 60, the shaft 59 is formed with a groove 63 for the reception of a key 64 which is slidable in the groove 63 and which secures to said shaft, a gear 65 having teeth 66. The key 64 is secured to the sleeve 55 by a screw 68 having a reduced shank 67 extending into an appropriate hole in said key. The shaft 59 is further provided with a second screw-threaded portion 69 mounting adjustable stop nuts 70, each of which is backed by a lock nut 71. The teeth 58 and 66 are of equal pitch diameters, and the gear 57 meshes with the teeth 5 of the spindle flange 4 while the gear 65 meshes with the gear 19 on the ring 15.

A casing 62' is formed integral with the plate 62 and carries a pair of pivots 72 and 73. A bell crank 74 having a contact button 75 at one end and a latch face 76 at the other end is mounted on the pivot 72, and a similar bell crank 77 having a contact button 77' and a latch face 78 is mounted on the pivot 73. A cylinder 79 is formed integral with the casing 53 and is provided with a bore 80 enclosing a compression spring 81 which bears at one end against a fixed bushing 82 having a bore 83 and at the other end against a slidable sleeve 84. A similar but smaller cylinder 85 is formed integral with the plate 62 and is provided with a bore 86 receiving a compression spring 87 which bears at one end against a fixed bushing 88 having a bore 89 and at the other end against the slidable sleeve 90. The spring 81 has a higher load rating than has the spring 87. A control rod 91 is mounted for reciprocation in the bores 83 and 89 of the bushings 82 and 88 respectively, and is provided with an aperture which snugly receives a pin 92 passing through the sleeve 84 and said aperture. The sleeve 90 is provided with a pin 93 which is received in a slot 94 in the rod 91.

From an inspection of Fig. 3 it will be obvious that the cylinders 79 and 85 are mounted on opposite sides of the handle 49, and the rod 91 is pivotally attached to said handle by means of a pin 95. A suitable lost motion slot is, of course, provided in said handle 49 for the pin 95. The handle 49 further carries a pivot 96 on which is mounted a link 97 pivoted at its opposite end as at 98 to a latch 99 pivoted at 100 to the plate 62 and provided at its opposite end with a latch face 101 for cooperation with the sleeve 90.

Referring again to Fig. 1, it will be noted that the handle 49 is provided with a slot 102 across which extends a pin 103. A brake control rod 104 is provided at one end with a notch 105, and said end is received in the slot 102 with the pin 103 engaged in the notch 105. The rod 104 is slidably mounted in a bore 106 in the casing 23 and is provided at its end opposite from that which contains the notch 105 with opposite milled beveled depressions 107. A resilient split ring 108 is mounted within the cylinder formed by the inner edge 109 of the ring 15, and the adjacent ends of said ring 108 are beveled for reception in the depressions 107 of the rod 104.

The handle 49 may be secured to the rock shaft 50 in the manner illustrated clearly in Fig. 1. The lower end 110 of the handle is bifurcated and each bifurcation is provided with a socket 111 for the reception of the rock shaft 50. The rock shaft is provided with a transverse bore 112 in which is received a pin 113 which is of such length as to project at each end beyond the rock shaft, and set screws 114 are threaded into said end 110 of the handle 49 and are received in sockets 115 at opposite ends of the pin 113. Lock nuts 116 are provided on said set screws 114.

The operation of the machine is as follows: The shaft 30 is driven by power means (not shown) and rotates the pinion 31. Presuming that the handle 49 is in such a position that the brake 108 is not set and that the clutch is not completely engaged, the spindle 1 will rotate because of the engagement of the pinion 31 with the flange 4, and the frictional engagement between the scroll plate 12 and the spindle (as at 13 and 14) is sufficient to rotate the scroll plate 12 at the same speed at which the spindle 1 is rotating. At this time, of course, the pinion 34 is rotating purely as an idler pinion. At this time, likewise, the teeth 5 of the spindle flange 4 engage the teeth 58 of the gear 57 while the teeth 20 of the ring 19 engage the teeth 66 of the gear 65. Since the pitch diameters of the teeth 5 and the teeth 20 are equal and the pitch diameters of the teeth 58 and 66 are equal, the gears 57 and 65 will be rotated at equal speeds and the control shaft 59 will have no longitudinal movement. A piece of work 3 is then inserted in the bore 2, and the handle 49 is thrown to the right and into the position shown in Fig. 3. This movement of the handle rotates the latch 99 to move the sleeve 90 to the left in Fig. 3 and compress the spring 87. The spring 81 is compressed by the movement of the rod 91 through the pin 95 connecting said rod to the handle, and the latch portion 78 of the bell crank lever 77 drops down into retaining position against the sleeve 84. This movement of the handle 49 also moves the clutch cone member 44 through the agency of the arm 52 and the yoke 43 toward the right in Fig. 2. The fingers 46 of the arms 40 ride outwardly along the cone surface 47 and force the bearing faces 48 of the arms 40 against the friction ring 36. Since the collar 39 is keyed to the shaft 30, the engagement of the clutch as described above will cause the pinion 34 to be rotated with the shaft. Because of the difference in the pitch diameters of the teeth 32 and the teeth 35, the ring 15 and consequently the scroll plate 12 will be rotated at a slightly higher speed than is the spindle 1, but at a speed less than twice the speed of the spindle. Because of this difference in speed of rotation, the slide blocks 7 carrying the cutter slides 8 and cutters 10 will follow the thread 18 of the scroll plate, and thus force the cutters 10 radially inward to increase the depth of their cut. When the handle 49 has been moved to the position shown in Fig. 3, the teeth 66 of the gear 65 are engaged with the teeth 20 of the ring 19 on the ring 15. Teeth 35 are now driving teeth 16, and, because of the difference in the pitch diameters of the teeth 16 and the teeth 5, the gear 65 will be rotated at a higher speed than that at which the gear 57 is rotated. Consequently there will be a differential relative rotation between the shaft 59 and the sleeve 55, and the shaft 59 will be moved slowly toward the left as viewed in Fig. 3. The stop nuts 70 are set in such a position that, when the cutters 10 have completed their cut, the nut 70 to the right in Fig. 3 will engage the contact button 77' of the bell crank lever 77 and raise the latch face 78 of said lever out of engagement with the sleeve 84. The force exerted by the spring 87 is received upon the latch face 76 of the lever 74 which has been released by the movement of the control shaft 59 toward the left, and consequently the force of the spring 81 tending to move the sleeve 84 and consequently the control rod 91 to the left of Fig. 3 is unopposed, and when the latch 78 has released the sleeve 84, the spring 81 will force the rod 91 and consequently the handle 49 toward the left in Fig. 3.

Such movement of the handle 49 disengages the clutch, and moves the brake rod 104 toward the left in Fig. 1, thus expanding the ring 108 and tending to stop the rotation of the scroll plate 12. The spindle 1 continues to turn in the same direction, but stoppage of the scroll plate reverses the direction of the differential rotation between the spindle 1 and the scroll plate 12, and it will be obvious that the differential rotation at this time is at a much greater speed than when both the spindle and the scroll plate are being rotated.

Consequently the slide blocks 7 and the cutters are very quickly retracted in a radially outward direction. When the scroll plate 12 is stopped, the rotation of the gear 65 is likewise stopped and the differential rotation between the gear 65 and the gear 57 is reversed and speeded up as in the case of the spindle and the scroll plate. Consequently the control shaft 59 is quickly moved back toward the position shown in Fig. 3 until the stop nut 70 strikes the contact button 75 and releases the engagement of the latch 76 with the sleeve 90. Since the handle 49 has been moved to the left, the latch face 101 of the latch 99 is no longer in engagement with the sleeve 90, and the above described movement of the lever 74 allows the spring 87 to expand. The spring 81 is slightly stronger than the spring 87, but the spring 87 is of such strength that, when it is released as above described, it will force the handle 49 into a position intermediate between that shown in Fig. 3 and that last above described. When the handle 49 has been moved to said intermediate position, the cycle of the machine has been completed, and it is in condition for resetting by the movement of the handle 49 to the position shown in Fig. 3.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A cut-off tool comprising a cutter, means for causing rotation between said cutter and a piece of work, means for advancing said cutter toward the axis about which it rotates, means for retracting said cutter, and automatic means for actuating said retracting means after a predetermined advance without reversing the direction of rotation between said cutter and such piece.

2. In a cut-off tool having a plurality of cutters adapted to be rotated about a stationarily held piece of work, means for advancing said cutters toward the axis about which they rotate, means for retracting said cutters, and automatic means for actuating said retracting means after a predetermined advance without reversing the direction of rotation of said cutters.

3. A cut-off tool comprising a tubular spindle having an annular flange, a scroll plate mounted adjacent said flange, a plurality of cutters mounted for radial reciprocation on said flange, means connecting said cutters with said scroll plate, means for rotating said spindle, means for rotating said scroll plate at a higher speed, and means for holding said scroll plate against rotation.

4. A cut-off tool comprising a tubular spindle having an annular flange, gear teeth formed on the periphery of said flange, a scroll plate mounted adjacent said flange, peripheral gear teeth carried by said scroll plate, radial slots in said flange, slide blocks mounted in said slots and having teeth engaging the thread of said scroll plate, cutters mounted on said flange and connected to said slide blocks, and means for operating said tool comprising a drive shaft, a drive pinion keyed to said drive shaft and engaging said flange gear teeth, a feed pinion loosely mounted on said shaft and engaging said scroll plate gear, clutch mechanism for connecting said pinion and said shaft for rotation, and means for rotating said drive shaft.

5. A cut-off tool comprising a tubular spindle having an annular flange, gear teeth formed on the periphery of said flange, a scroll plate mounted adjacent said flange, peripheral gear teeth carried by said scroll plate, radial slots in said flange, slide blocks mounted in said slots and having teeth engaging the thread of said scroll plate, cutters mounted on said flange and connected to said slide blocks, and means for operating said tool comprising a drive shaft, a drive pinion keyed to said drive shaft and engaging said flange gear teeth, a feed pinion loosely mounted on said shaft and engaging said scroll plate gear, clutch mechanism for connecting said pinion and said shaft for rotation, a brake for said scroll plate, and operating means connected to said clutch mechanism and to said brake whereby movement in one direction engages said clutch and releases said brake and movement in the other direction releases said clutch and sets said brake.

6. A cut-off tool comprising a tubular spindle having an annular flange, gear teeth formed on the periphery of said flange, a scroll plate mounted adjacent said flange, peripheral gear teeth carried by said scroll plate, radial slots in said flange, slide blocks mounted in said slots and having teeth engaging the thread of said scroll plate, cutters mounted on said flange and connected to said slide blocks, a drive shaft mounted adjacent said spindle, a drive pinion keyed to said drive shaft and meshing with said flange gear, a feed pinion mounted on said shaft and meshing with said scroll plate gear, clutch means for connecting and disconnecting said feed pinion to and from said drive shaft, a lever for operating said clutch means, a brake for said scroll plate connected to said lever, and automatic means for operating said lever.

7. A cut-off tool comprising a tubular spindle having an annular flange, gear teeth formed on the periphery of said flange, a scroll plate mounted adjacent said flange, peripheral gear teeth carried by said scroll plate, radial slots in said flange, slide blocks mounted in said slots and having teeth engaging the thread of said scroll plate, cutters mounted on said flange and connected to said slide blocks, a drive shaft mounted adjacent said spindle, a drive pinion keyed to said drive shaft and meshing with said flange gear, a feed pinion mounted on said shaft and meshing with said scroll plate gear, clutch means for connecting and disconnecting said feed pinion to and from said drive shaft, a lever for operating said clutch means, a brake for said scroll plate connected to said lever, and automatic means for operating said lever comprising a control shaft journalled for rotation and reciprocation in supports, a sleeve journalled for rotation but held against reciprocation in a support and provided with a screw-threaded bore for the reception of a screw-threaded end of said control shaft, a gear on said sleeve meshing with said spindle gear, a gear slidably keyed to said control shaft and meshing with said scroll plate gear, adjustable stops on said control shaft, spring means for oscillating said lever, and latches adapted to be operated by said stops and cooperating with said spring means.

8. In a cut-off machine, a spindle, cutters carried by said spindle and movable with respect thereto, a scroll plate cooperating with said cutters, means for rotating said spindle, means for rotating said scroll plate at a higher speed, a brake for said scroll plate, and means for rendering said scroll-plate-rotating means inoperative and applying said brake without affecting said spindle-rotating means.

9. In a cut-off machine, a cutter-carrying spindle, a scroll plate cooperating with cutters carried by said spindle, means for rotating said spindle, means for rotating said scroll plate at a higher speed, a brake for said scroll plate comprising a resilient split ring mounted within a cylindrical flange upstanding from one face of said scroll plate, and means for rendering said last-mentioned means inoperative and expanding said ring.

10. In a cut-off machine, a cutter-carrying spindle, a scroll plate cooperating with cutters carried by said spindle, means for rotating said spindle, means for rotating said scroll plate at a higher speed, a brake for said scroll plate comprising a resilient split ring mounted within a cylindrical flange upstanding from one face of said scroll plate, a rod extending between the adjacent ends of said ring, said ring ends and the contacting portions of said rod being bevelled, and means for rendering said last-mentioned means inoperative and moving said rod to expand said ring.

11. In a cut-off machine, a cutter-carrying spindle, a scroll plate cooperating with cutters carried by said spindle, means for rotating said spindle, means for rotating said scroll plate at a higher speed, a brake for said scroll plate, a rod having milled, bevelled depressions in opposite sides of one of its ends and having said milled portions in contact with the adjacent, correspondingly bevelled ends of said ring, and means for rendering said last-mentioned means inoperative and moving said rod away from said scroll plate, thereby forcing said ring ends apart.

12. In a cut-off machine, a spindle carrying cutters, a scroll plate cooperating with said cutters, means for rotating said spindle, a pinion for rotating said scroll plate, a drive shaft carrying said pinion, and a clutch for said pinion comprising an annular friction surface on said pinion, a collar on said shaft adjacent said pinion, an arm pivoted to said collar and provided with means adapted to engage said friction surface, and means to rotate said arm about its pivot to force said last-mentioned means into close frictional contact with said friction surface.

13. In a cut-off machine, a spindle carrying cutters, a scroll plate cooperating with said cutters, means for rotating said spindle, a pinion for rotating said scroll plate, a drive shaft carrying said pinion, and a clutch for said pinion comprising an annular friction ring mounted on said pinion, a clutch collar keyed to said shaft adjacent said pinion, a plurality of arms pivoted to said collar and provided with radially directed fingers at one end and bearing surfaces at the other end, a cone clutch member journalled for reciprocation on said shaft and adapted to engage said fingers to rock said bearing surfaces into close frictional contact with said friction ring.

14. In a cut-off machine having a spindle and a scroll plate, means for rotating said spindle, means for rotating said scroll plate, means for preventing rotation of said scroll plate, and a lever for operating both said last two means, mechanism for actuating said lever comprising a control rod pivotally pinned to said lever, a pair of cylinders mounted on opposite sides of said lever and receiving opposite ends of said control rod, compression springs in said cylinders bearing at their outer ends against fixed bushings and at their inner ends against sleeves pinned to said control rod, means for holding said springs against expansion, and automatic means for rendering said last-mentioned means inoperative.

15. In a cut-off machine having a spindle and a scroll plate, means for rotating said spindle, means for rotating said scroll plate, means for preventing rotation of said scroll plate, and a lever for operating both said last two means, mechanism for actuating said lever comprising a control rod pivotally pinned to said lever, a pair of cylinders mounted on opposite sides of said lever and receiving opposite ends of said control rod, compression springs in said cylinders bearing at their outer ends against fixed bushings and at their inner ends against sleeves pinned to said control rod, a bell-crank lever mounted adjacent each cylinder and provided with a latch face for cooperation with the respective sleeves, and automatic means for rotating said levers selectively to release said sleeves.

16. In a cut-off machine having a spindle and a scroll plate, means for rotating said spindle, means for rotating said scroll plate, means for preventing rotation of said scroll plate, and a lever for operating both said last two means, mechanism for actuating said lever comprising a control rod pivotally pinned to said lever, a pair of cylinders mounted on opposite sides of said lever and receiving opposite ends of said control rod, compression springs in said cylinders bearing at their outer ends against fixed bushings and at their inner ends against sleeves pinned to said control rod, a bell-crank lever mounted adjacent each cylinder and provided with a latch face for cooperation with the respective sleeves, and automatic means dependent upon the relative speeds of rotation of said spindle and said scroll plate for rotating said levers selectively to release said sleeves.

17. In a cut-off machine having a spindle and a scroll plate, means for rotating said spindle, means for rotating said scroll plate, means for preventing rotation of said scroll plate, and a lever for operating both said last two means, mechanism for actuating said lever comprising a control rod pivotally pinned to said lever, a pair of cylinders mounted on opposite sides of said lever and receiving opposite ends of said control rod, compression springs in said cylinders bearing at their outer ends against fixed bushings and at their inner ends against sleeves, an aperture in said control rod, a pin passing through one of said sleeves and through said aperture and fitting said aperture, a slot in said control rod, a pin passing through the other of said sleeves and through said slot, an arm having a latch face for engagement with said last-named sleeve, a link connecting said arm with said lever, a bell-crank lever mounted adjacent each cylinder and provided with a latch face for cooperation with the respective sleeves, and automatic means dependent upon the relative speeds of rotation of said spindle and said scroll plate for rotating said levers selectively to release said sleeves.

Signed by us this 15th day of November, 1927.

RALPH E. HYDE.
DANIEL SCHAPPI.